(No Model.)
C. W. BEEHLER.
BOX FASTENER.
No. 493,057. Patented Mar. 7, 1893.
Fig. I.
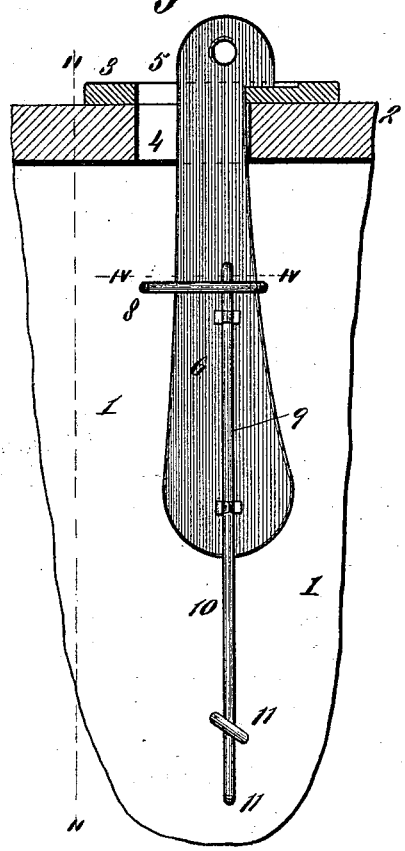
Fig. II.
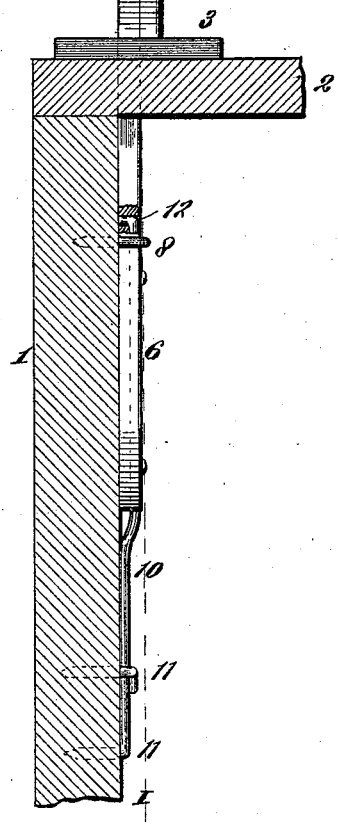
Fig. III.
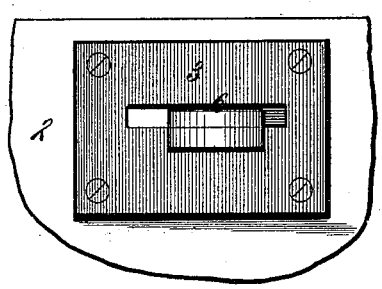
Fig. IV.
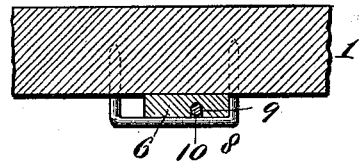
Attest:
Walter E. Allen
Geo. E. Cruse
Inventor:
Charles W. Beehler
By Wright Bros
attys

UNITED STATES PATENT OFFICE.

CHARLES W. BEEHLER, OF ST. LOUIS, MISSOURI, ASSIGNOR TO THE AMERICAN NOVELTY MANUFACTURING COMPANY, OF SAME PLACE.

BOX-FASTENER.

SPECIFICATION forming part of Letters Patent No. 493,057, dated March 7, 1893.

Application filed August 24, 1892. Serial No. 444,025. (No model.)

*To all whom it may concern:*

Be it known that I, CHARLES W. BEEHLER, of the city of St. Louis, in the State of Missouri, have invented a certain new and useful Improvement in Box-Fasteners, of which the following is a full, clear, and exact description, reference being had to the accompanying drawings, forming part of this specification.

Heretofore considerable difficulty has been experienced in maintaining the spring in contact with the hook on the class of fasteners to which my present invention relates. After considerable use the screw or bolt, which pivots the hook to the box, becomes loose, and the spring is apt to get in behind the hook, or between the hook and the box, and fail to perform its work. Also the spring is liable to become bent, when exposed, and its efficiency affected in this way.

The object of my invention is to obviate these difficulties; and my invention consists in features of novelty hereinafter fully described and pointed out in the claim.

Figure I is a vertical section, through the lid of a box, taken on line I—I, Fig. II, showing part of the body of the box, and the hook, and spring in elevation. Fig. II is a section taken on line II—II, Fig. I. Fig. III is a top view; and Fig. IV is a horizontal section, taken on line IV—IV, Fig. I.

Referring to the drawings, 1 represents part of a box, to which my fastener is applied.

2 represents part of the lid.

3 is a plate secured to the lid over an opening 4 in the lid, through which the hook passes; the plate has an opening 5 over the opening 4 in the lid.

6 represents a hook for engaging the plate 3, and 8 is a staple which serves to guide the hook and keep it from moving too far in either direction.

The hook is provided with a longitudinal groove 9, in which fits the free end of a spring 10, which is secured to the box at 11 and which supports the hook. The groove 9 does not extend entirely through the hook, so that the spring, fitting in the groove, is not only protected from the contents of the box, but is also prevented from working in between the hook and the body of the box, as the inner wall of the groove forms a bearing, preventing any deflection of the spring. The spring is thus held permanently in contact with the hook, and is not liable to get out of order. The upper end of the spring is bent at an angle and fits in a hole in the hook as shown at 12, Fig. II. The spring thus serves to connect the hook to the box and to hold its upper end into engagement with the plate 3.

13 represents small projections cast on the hook and which are bent over the spring after it is inserted.

I claim as my invention—

The combination of a hook adapted to engage a plate secured to the lid of the box, and a spring; said hook being supported by said spring and being formed with a groove in its lower end to receive the spring; substantially as and for the purpose set forth.

CHARLES W. BEEHLER.

In presence of—
ALBERT W. EBERSOLE,
BENJN. A. KNIGHT.